US006565930B1

(12) United States Patent
Grace et al.

(10) Patent No.: US 6,565,930 B1
(45) Date of Patent: *May 20, 2003

(54) HIGH-EFFICIENCY PLASMA TREATMENT OF PAPER

(75) Inventors: Jeremy M. Grace, Penfield, NY (US); Louis J. Gerenser, Webster, NY (US); Christine J. Landry-Coltrain, Fairport, NY (US); Kurt D. Sieber, Rochester, NY (US); Michael J. Heinsler, Rochester, NY (US); Dennis R. Freeman, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/574,772

(22) Filed: May 19, 2000

Related U.S. Application Data

(63) Continuation-in-part of application No. 09/349,288, filed on Jul. 7, 1999, now Pat. No. 6,149,985.

(51) Int. Cl.[7] .............................. C08F 2/52; C08J 7/18; H05H 1/46; B05P 3/06
(52) U.S. Cl. .................. 427/536; 427/491; 427/539; 427/534
(58) Field of Search ................. 427/488, 491, 427/534, 536, 538, 539, 569

(56) References Cited

U.S. PATENT DOCUMENTS

| | | |
|---|---|---|
| 3,288,638 A | 11/1966 | Van Paassen et al. |
| 3,309,299 A | 3/1967 | Mantell |
| 3,549,406 A | 12/1970 | Ambusk |
| 4,451,497 A | 5/1984 | Dolezalek et al. |
| 5,113,790 A | 5/1992 | Geisler et al. |
| 5,223,338 A | 6/1993 | Maljotra |
| 5,224,441 A | 7/1993 | Felts et al. |
| 5,324,414 A | 6/1994 | Spahn et al. |
| 5,354,813 A | 10/1994 | Farooq et al. |

(List continued on next page.)

FOREIGN PATENT DOCUMENTS

| | | |
|---|---|---|
| FR | 2 711 680 A1 | 5/1995 |
| GB | 1 561 383 A | 2/1980 |

OTHER PUBLICATIONS

*Surfaces & Coatings Technology* 93 1997–No Month pp. 261–264, Polymer Surface Modification by Plasma Source Ion Implantation, by Seunghee Han, Yeonhee Lee, Haidong Kim, Gon–ho Kim, Junghey Lee, Jung–Hyeon Yoon, Gunwoo Kim.

(List continued on next page.)

*Primary Examiner*—Marianne Padgett
(74) *Attorney, Agent, or Firm*—Mark G. Bocchetti

(57) ABSTRACT

A method and apparatus are taught for treating paper webs for obtaining the proper surface characteristics to promote adhesion of nonphotosensitive coating materials and/or layers typically coated thereon. The web is passed through a high-voltage sheath region or dark space of the plasma generated by a powered electrode residing in a discharge zone. The frequency of the driving voltage must be above a lower bound dictated by the properties of the paper support and the plasma, and it must be below an upper bound beyond which the sheath voltages drop significantly and it is observed that the benefits of this approach diminish. The dark space is generated by a treatment electrode in a treatment zone. There is a counter electrode having a surface area in said treatment zone which is at least as great as the surface area of the treatment electrode. A power supply is included for driving the treatment electrode with an oscillating high voltage at a frequency less than about 2 MHz and greater than $1/t_c$ where $t_c$ is the charging time of a web surface exposed to a rms ion current in the plasma.

30 Claims, 5 Drawing Sheets

FOREIGN PATENT DOCUMENTS

| | | |
|---|---|---|
| 5,403,955 A | 4/1995 | Farooq |
| 5,493,117 A | 2/1996 | Tamaki et al. |
| 5,538,841 A | 7/1996 | Grace et al. |
| 5,563,029 A | 10/1996 | Grace et al. |
| 5,853,965 A | 12/1998 | Haydock et al. |
| 5,866,282 A | 2/1999 | Bourdelais et al. |
| 5,874,205 A | 2/1999 | Bourdelais et al. |
| 5,888,643 A | 3/1999 | Aylward et al. |
| 5,895,558 A | 4/1999 | Spence |

OTHER PUBLICATIONS

*Rarefied Gas Dynamics: Experimental Techniques and Physical Systems*, vol. 158 Progress in Astronautics and Aeronautics, "Materials Processing in Dual–Mode Microwave/Radiofrequency Plasmas" by J.E. Klemberg–Sapieha et al. Jul. 26–30, 1992.

Glow Discharge Processes: Sputtering and Plasma Etching, by Brian Chapman; John Wiley & Sons, pp. 52–71, 80–81, 112–113, 156–169. No month.

Dual–Frequency N2 and NH3 Plasma Modification of Polyethylene and Polyimide by J.E. Klemberg–Sapieha et al, *J. Vac Sci, Technol* A 9 (6), Nov./Dec. 1991, pp. 2975–2981.

R.H. Cramm and D.V. Bibee; *Tappi* "The Theory and Practice of Corona Treatment for Improving Adhesion", by vol. 65 (8); Aug. 1982, pp. 75–78.

*J.Adhesion Sci.Technol.* vol. 3 (5) No month 1989, pp. 321–335, Low–Molecular–Weight Materials on Corona–Treated Polypropylene, by M. Strobel, C. Donatov, J.M. Strobel, C.S. Lyons, S.J. Perron and M.C. Morgen.

*J Vac Sci Technol* A 16 (3), May/Jun. 1998, pp. 1710–1715, "Surface Studies of Plasma Source Ion Implantation Treated Polystyrene", by Yeonhee Lee, Seunghee Han, Jung–Hye Lee, Jung–Hyeon Yoon, Hyun Eui Lim, and Kang–Jin Kim.

*IEEE Transactions on Industry Applications*, vol. 1A–11 No. 3, May/Jun. 1975, pp. 328–335, "Electrical Characterization of a Corona Discharge for Surface Treatment", by L.A. Rosenthal and D.A. Davis.

*Langmuir* (no month): vol. 15, #8 1999 pp. 2985–2992, Application of AFM on the Adhesion Studies of Oxygen––Plasma–Treated Polypropylene and Lignocellulosics, by R. Mahleberg, H.E.–M. Niemi, F.S. Denes and R.M. Rowell.

Handbook for Pulp & Paper Technologists: $2^{nd}$ Edition, by G.A. Smook, no month 1992, p. 1.

HIGH-EFFICIENCY PLASMA TREATMENT OF PAPER

CROSS-REFERENCE TO RELATED APPLICATIONS

This is a continuation-in-part application of U.S. application Ser. No. 09/349,288, filed Jul. 7, 1999, now U.S. Pat. No. 6,149,985 by Jeremy M. Grace, et al., and entitled, "HIGH EFFICIENCY PLASMA TREATMENT OF IMAGING SUPPORTS".

FIELD OF THE INVENTION

This invention relates generally to the manufacture of paper and imaging supports and, more particularly, to a method and apparatus for obtaining the proper surface characteristics of paper supports to promote adhesion of photosensitive coating materials, image forming layers, non-photosensitive polymeric coatings or laminates, and/or layers typically coated thereon.

BACKGROUND OF THE INVENTION

Electrical discharge treatments are widely used to promote adhesion of a variety of organic and inorganic layers to organic polymer substrates. Examples of the use of electrical discharge treatments are found in U.S. Pat. No. 5,538,841 and references cited therein. Additional examples are found in European Pat. Application EP 0 758 687 A1 and references cited therein, as well as well as World Pat. WO 97/42257. An example of low-pressure electrical discharge treatments for the treatment of paper and related materials are the oxygen plasma treatments of craft pulp, filter paper, and wood, as discussed by Mahlberg et al. (R. Mahlberg, H. E.-M. Niemi, F. S. Denes, and R. M. Rowell, *Langmuir* 15, pp. 2985–92, 1999).

A variety of treatment geometries (i.e. positioning of the article to be treated relative to the discharge electrodes, shape of the electrodes, and shape of the article to be treated) are possible (see, for example U.S. Pat. Nos. 3,288,638 and 3,309,299). The need to treat continuous sheets or rolls of polymeric support material (i.e., webs) has generally led to treatment apparatus design for the purposes of conveying a web through an electrical discharge zone. This purpose has been achieved either by suspending the polymer article in a free span between conveyance rollers, as disclosed in U.S. Pat. No. 5,493,117 or on a drum, as disclosed in U.S. Pat. Nos. 4,451,497 and 5,224,441. 4,451,497 and 5,493,117, as well as U.S. Pat. No. 5,538,841, all intend to provide surface treatments for use in the manufacture of photographic imaging elements on polyester supports. Dolazalek et al. (U.S. Pat. No. 4,451,497) disclose an apparatus for conveying a polymer web material into a vacuum chamber, through a treatment zone and out of the vacuum chamber. The treatment configuration taught is essentially a corona treatment geometry wherein the web travels along a rotating drum that is surrounded by a plurality of discharge electrodes. The treatment is intended to prepare a substrate to be coated with photographic emulsion.

Tamaki et al. (U.S. Pat. No. 5,493,117) disclose an apparatus similar to that of Dolazalek et al. having the similar purpose of providing a support useable for a photosensitive material. However, Tamaki et al. suspend the web in free span between conveyance rollers and have a plurality of treatment electrodes located on either side of the free span in order to treat both sides of the web simultaneously.

Felts et al. (U.S. Pat. No. 5,224,441) disclose a plasma treatment and coating apparatus wherein the web is conveyed over the surface of an electrified drum, facing a grounded counter electrode. Grace et al. (U.S. Pat. No. 5,538,841) disclose nitrogen-based and oxygen-based surface chemistries that promote adhesion of gelatin-containing layers to respective nitrogen-plasma-treated and oxygen-plasma-treated polyester webs, also for the manufacture of supports usable for photosensitive materials.

A common technique in the industry for treatment of paper surfaces at atmospheric pressures is corona discharge treatment (CDT) (R. H. Cramm and D. V. Bibee, *Tappi*, 65 (8), pp.75–8 (1982); and W. J. Ambusk, U.S. Pat. No. 3,549,406). As typically practiced, this treatment is more accurately described as a dielectric barrier discharge treatment. As mentioned above, a typical geometry consists of a drum with a series of electrodes placed at a specified radius from the center of the drum. Furthermore, a dielectric layer of insulating material having suitable thickness so that it does not break down at the applied voltages is placed on either the drum or the electrodes. This layer is called the dielectric barrier. At the pressures typically used (i.e. 1 atmosphere) the treatments are generally carried out in air, and efforts to change the dominant treatment chemistry from oxygen to something other than oxygen are not successful. Although air is composed of 80% nitrogen, oxygen is much more reactive than nitrogen, therefore, oxygen present in the discharge treatment zone dominates the gas-phase chemistry. Furthermore, entrained air (present as a layer of gas carried on the moving web surface as it enters the treatment device) provides a considerable source of oxygen, even when the treatment zone is enclosed and purged with an oxygen-free gas.

The typical gas-phase chemistry in a dielectric barrier discharge in air also produces unwanted species such as ozone and oxides of nitrogen, both of which must be eliminated from the work environment with pollution abatement technology. These species, in particular the oxides of nitrogen, can also have undesirable effects on the treated surfaces, as they may interact with coatings applied to the treated surfaces.

Better control of the treatment gas environment can be achieved at reduced pressures (i.e., using a vacuum process). At reduced pressures, the method of conveyance of the web material through the treatment zone has an important effect on the nature of the plasma treatment. In the case of Tamaki et al., the polymer surface to be treated is electrically floating in the discharge zone and moves past one or more powered discharge electrodes. In the case of Dolazalek et al., if the drum is electrically isolated from the walls of the apparatus, the article also is electrically floating in the discharge zone and moves past one or more powered discharge electrodes. If the drum is electrically grounded, however, the surface potential of the polymer article is determined by several factors. These factors include thickness and dielectric properties of the article, the driving frequency of the discharge, the electron density and plasma potential of the discharge, and the relative areas of the discharge electrode and the combination of the drum surface and the grounded inner walls of the apparatus. At a sufficiently low driving frequency (the upper limit being determined by the aforementioned characteristics of the article and plasma), the article surface will charge to the floating potential and the situation will be similar to that of an electrically isolated drum. At a sufficiently high driving frequency (the lower limit being determined by aforementioned characteristics of the article and plasma) the surface of the article will remain near ground potential. Consequently, if the effective grounded surface area in the discharge zone is significantly larger than that of the powered electrode(s), the surface of the article to be treated is generally bombarded by ions having a bombardment energy that is largely determined by the difference between a plasma potential of some tens of volts and a ground potential.

In contrast, if the areas of the powered electrode(s) and the effective grounded electrode are comparable, the ion bombardment of the polymer article will be largely determined by the potential applied to the powered electrode and can have a peak value of several hundred volts or more. In this case, the ion bombardment energies are more characteristic of an etch process. The etching character of the process can be further enhanced by reducing the area of the polymer article, supporting electrode (e.g., drum), and effective grounded surface area relative to that of the driven electrode(s), or by electrically isolating the supporting electrode of reduced area and applying the driving voltage thereto. The effect of the relative areas of driven and grounded electrodes on the effective bombarding potentials at their respective surfaces is well known to those skilled in the art of plasma processing for microelectronics. In that art it is known that alternating-current discharges established between a driven electrode and a ground electrode of equal size produce similar bombardment effects at either electrode. It is also known that alternating-current discharges established between electrodes of dissimilar area produce more bombardment at the smaller electrode. It is further known that higher frequency discharges operate at lower amplitudes of driving voltage (for comparable input power). Thus the bombarding potential is also reduced as driving frequency increases. The aforementioned behavior of the bombarding potential at the electrode surfaces applies reasonably well throughout the radio frequency range (i.e., ~3 kHz to ~100 MHz). For the purposes of surface modification of polymer webs, treatments in which significant ion bombardment and etch processes may occur have generally been avoided in the prior art related to supports for photographic elements. While the object of polymer surface modification is generally to introduce new chemical species into the surface region by reaction with species in the electrical discharge, the object of etch processes is to remove significant amounts of material from the surface region. Furthermore, these etch processes are considered undesirable because the materials to be modified tend to be temperature sensitive and etch processes can generate substantial heat or may generate considerable low-molecular-weight fragments in the surface region of the treated support.

Examples of background art that teach away from using etch-like processes for the purposes of polymer surface modification are found in the open literature. J. E. Klemberg-Sapieha et al. (*J. Vac. Sci. Technol. A*, 9 (6) (1991) pp. 2975–81) disclose a dual-frequency approach to modification of polymer surfaces in nitrogen plasma and in ammonia plasmas. In their work, the high-frequency microwave power couples effectively to the bulk of the discharge zone and generates the chemically active species in the plasma. By applying a lower frequency (rf: 13.56 MHz) potential to the substrate holder, they create a significant bias potential, which results in significant bombardment of the substrate (i.e. polymer article being treated) by ions extracted from the plasma. Their work shows clearly that the maximum amount of nitrogen incorporated into the treated polymer surface is for the microwave plasma with no applied rf potential. As the rf potential is applied (resulting in bias potentials of up to 500 V) the incorporated nitrogen decreases for both nitrogen and ammonia plasmas and for both polymers studied in their work (i.e., polyethylene and polyimide). While dual-frequency approach has shown much success for tailoring the properties of hard coatings such as silicon nitride and diamond-like carbon (see for example, J. E. Klemberg-Sapieha et al. in *Rarefied Gas Dynamics: Experimental Techniques and Physical Systems*, B. D. Shizgal and D. P. Weaver, eds., *Progress in Astronautics and Aeronautics*, vol. 158, A. R. Seebass, Editor-in-chief, American Institute of Aeronautics and Astronautics, Inc., 1993), the application of this approach to polymer surface modification has suggested that enhanced ion bombardment by use of a low-frequency bias is generally disadvantageous.

Another example of using a plasma source with a separately biased sample holder is found in the work of S. Han et al. (*Surface Coatings Technology* 93 (1997) 261–4) and Lee et al. (*J. Vac. Sci. Technol.* A 16(3), (1998) 1710–15). Han et al. and Lee et al. use an rf (13.56 MHz) inductively coupled plasma source (with magnetic enhancement) in combination with a pulse generator used to apply short (10–20 $\mu$s) high-voltage (up to −10 kV) pulses to the substrate holder. In their work, Han et al. and Lee et al. found that the use of high-voltage pulses alone to generate a discharge and effect surface modification is less effective than the use of the rf plasma in combination with high-voltage pulses applied to the substrate holder. Furthermore, they found that the use of the rf-driven plasma alone is less effective than in combination with the high-voltage pulses.

The results for the use of the high-voltage pulses alone are consistent with the findings of Klemberg-Sapieha et al. (described above) that applying a bias voltage to the substrate holder is not advantageous for polymer surface modification. In contrast, the results for the combination of an rf plasma and high-voltage pulses as compared to the rf plasma alone appears to show some interesting effects. The apparatus as described by Han et al. and Lee et al., however, has several drawbacks. First, the high-voltage pulses are short (microseconds) and must be applied repetitively (1 kHz, e.g.) for significant time (several minutes) to modify polymer surfaces to the degree shown by Han et al. and Lee et al. Second, the apparatus requires rf power to be applied in an inductively coupled configuration, high-voltage pulsing electronics, and permanent magnets. Third, the apparatus as described is clearly designed to treat small articles such as silicon wafers, as opposed to wide continuous rolls of web. All of the above drawbacks present complications for application of this technology to high-speed treatment of polymer supports.

Grace et al. disclose the use of nitrogen plasmas and oxygen plasmas to treat polyester supports for promoting the adhesion of aqueous coatings thereto. Using low-frequency (60 Hz–40 kHz) discharges with the polyester support electrically floating in the plasma, Grace et al. found nitrogen-containing and oxygen-containing surfaces that are demonstrated to promote excellent adhesion between gelatin-containing layers and plasma-treated polyester supports. The doses demonstrated to produce good adhesion are in the range of 0.5–4 $J/cm^2$. (This dose parameter is calculated based on the delivered power, the width of the treatment zone and the web speed: Dose=Power/[width×web speed]). In this dose range, treatment times of 1 s and somewhat below are readily attainable on the manufacturing scale. Grace et al. teach the appropriate surface chemistry for the given application and disclose optimized treatment parameters. Neither the use of substrate bias voltage, nor the use of an etch-mode plasma treatment are disclosed, nor is it suggested that such approaches should be more effective at obtaining the desired surface chemistry. The present invention relates to the efficient production of surfaces bearing chemical similarity to those disclosed by Grace et al. The present invention further relates to the use of the high-efficiency treatment configuration for efficient production of modified surfaces of paper stock. In particular, the present invention also relates to the efficient removal of aliphatic species (such as stearates which are commonly used in paper sizing) and efficient production of surface acid groups. The combination of removal of low-molecular-weight aliphatic material and incorporation of acid-containing species (e.g., R—O—C=O) is effective for promoting adhesion of a variety of polymeric layers typically coated onto paper stock.

SUMMARY OF THE INVENTION

It is therefore an object of the present invention to provide a method and apparatus for obtaining high-efficiency plasma treatments of paper including paper imaging supports using nitrogen or oxygen plasmas, or plasmas containing water vapor.

It is a further object of the present invention to provide a method and apparatus for obtaining high-efficiency plasma treatments of paper including paper imaging supports at low treatment doses.

Still another object of the present invention is to provide a method and apparatus for obtaining high-efficiency plasma treatments of paper including paper imaging supports with reduced power consumption.

Yet another object of the present invention is to provide a method and apparatus for obtaining high-efficiency plasma treatments of paper including imaging supports with increased treatment speed.

A further object of the present invention is to provide high-efficiency treatments requiring simple power supplies and using low-density capacitively coupled plasmas, as opposed to magnetically enhanced plasmas, microwave plasmas, or scenarios requiring fast high-voltage pulses.

Still another object of the present invention is to reduce required treatment times and/or reduce the treatment powers required to produce surface treated paper suitable for production of imaging elements and photographic supports.

Briefly stated, the foregoing and numerous other features, objects and advantages will become readily apparent upon a review of the detailed description, claims and drawings set forth herein. These features, objects and advantages are accomplished by passing the paper stock through the high-voltage sheath region of the plasma generated by a powered electrode residing in a discharge zone. The frequency of the driving voltage must be above a lower bound dictated by the properties of the paper support and the plasma, and it must be below an upper bound beyond which the sheath voltages drop significantly and it is observed that the benefits of this approach diminish. Like Lee et al. and Han et al., it has been found that the present invention is an improvement over the use of a simple rf plasma (driven at 13.56 MHz) to treat webs. In contrast, however, it has also been found that significant improvements in treatment efficiency are gained by placing the web on the treatment electrode and by reducing the driving frequency considerably below 13.56 MHz. These improvements are gained without the need for a second power source, such as the high-voltage pulse source described by Han et al. and Lee at al. Furthermore, the treatments can be carried out in a continuous mode rather than a pulsed mode. These results are demonstrated for a single treatment electrode and do not require a plurality of electrodes as taught by Dolazalek et al. and Tamaki et al.

Finally, these results are demonstrated for a low-density, capacitively coupled plasma source, without the need for magnetic enhancement or inductive coupling as used by Han et al. and Lee et al. The demonstrated treatment improvements reduce the required treatment dose by an order of magnitude, thus enabling significant increases in web conveyance speed and/or significant reductions in applied power to effect a surface treatment. These high-efficiency treatments generate appropriate surface chemistry for adhesion between paper supports and polymer coatings.

The efficiency of the method of the present invention is evidenced by significant treatment effect at low treatment doses (where dose is as described above). Low treatment doses translate to manufacturing benefits in terms of increased treatment speed, reduced power consumption, or a combination of both. The gains in treatment speed may be sufficient to allow treatment in line with resin coatings or laminating at high speeds (for example, extruding or laminating polyolefin resins onto paper stock at 300 m/min line speeds).

This invention could be used with a broad range of papers, from high end papers, such as photographic paper to low end papers, such as newsprint. Therefore, a broad definition of paper is intended to be used for the purposes of the present invention. The traditional definition of paper is "a felted sheet formed on a fine screen from a water suspension of fibers [and additives]" (Smook, G. A. *Handbook for Pulp and Paper Technologists: $2^{nd}$ Edition*. Angus Wilde Publications: Canada, 1992). Paper is usually made with vegetable fibers, but synthetic or mineral fibers could be used for special applications. In the paper industry, vegetable fibers are classified into woody and non-woody fibers. Non-woody fibers include bagasse, bamboo, and straw. Woody fibers come from trees and are the principal source of cellulosic fiber for paper and pulping operations.

There are many other factors that affect paper properties. Chemical additives are utilized to enhance or give the paper certain properties. Additives can improve such properties as paper strength, optical properties, or sheet formation. These additives are utilized according to the end use. The machines used to form, press and dry the paper are important for end sheet properties. Additional processing steps, such as calendering and coating, also affect end sheet properties.

While the present invention relates to providing adhesion between polymer coatings or laminates and plasma-treated paper supports, it should be apparent to those skilled in the art that it may be applied to other kinds of coatings on plasma-treated polymer supports. This invention may be applied to any coating capable of favorable chemical interaction with amines or imines (as resulting from nitrogen plasma treatment or treatments in gases mixed with nitrogen-containing molecules) or ether, epoxy, hydroxyl, carboxyl, or carbonyl groups (as resulting from oxygen plasma treatment or treatments in gases mixed with water vapor or gases mixed with other gases having oxygen atoms in the molecular structure). For example, the present invention can be applied to metallized plastics, such as for example silver coated on polyesters (as described in U.S. Pat. No. 5,324,414). It can also be applied to latex polymer dispersions or polymer solutions coated onto plasma-treated polymer supports. It can further be applied to coating of hydrophilic colloid layers onto plasma-treated supports. It can also be applied to grafting of selectively reactive species onto plasma-treated supports such as, for example, vinylsulfone hardening agents used as tie layers or anchors, as described in Grace et al. (U.S. Pat. No. 5,563,029). This invention may also be applied to any coating that benefits from the removal of a weakly bound low molecular weight material from the support surface prior to coating such as for example, sizing agents, release agents, or plasticizers used in production of supports. It can further be applied to the treatment of textured, fibrous, or porous polymer materials.

DESCRIPTION OF THE PREFERRED EMBODIMENT

Figure 1:
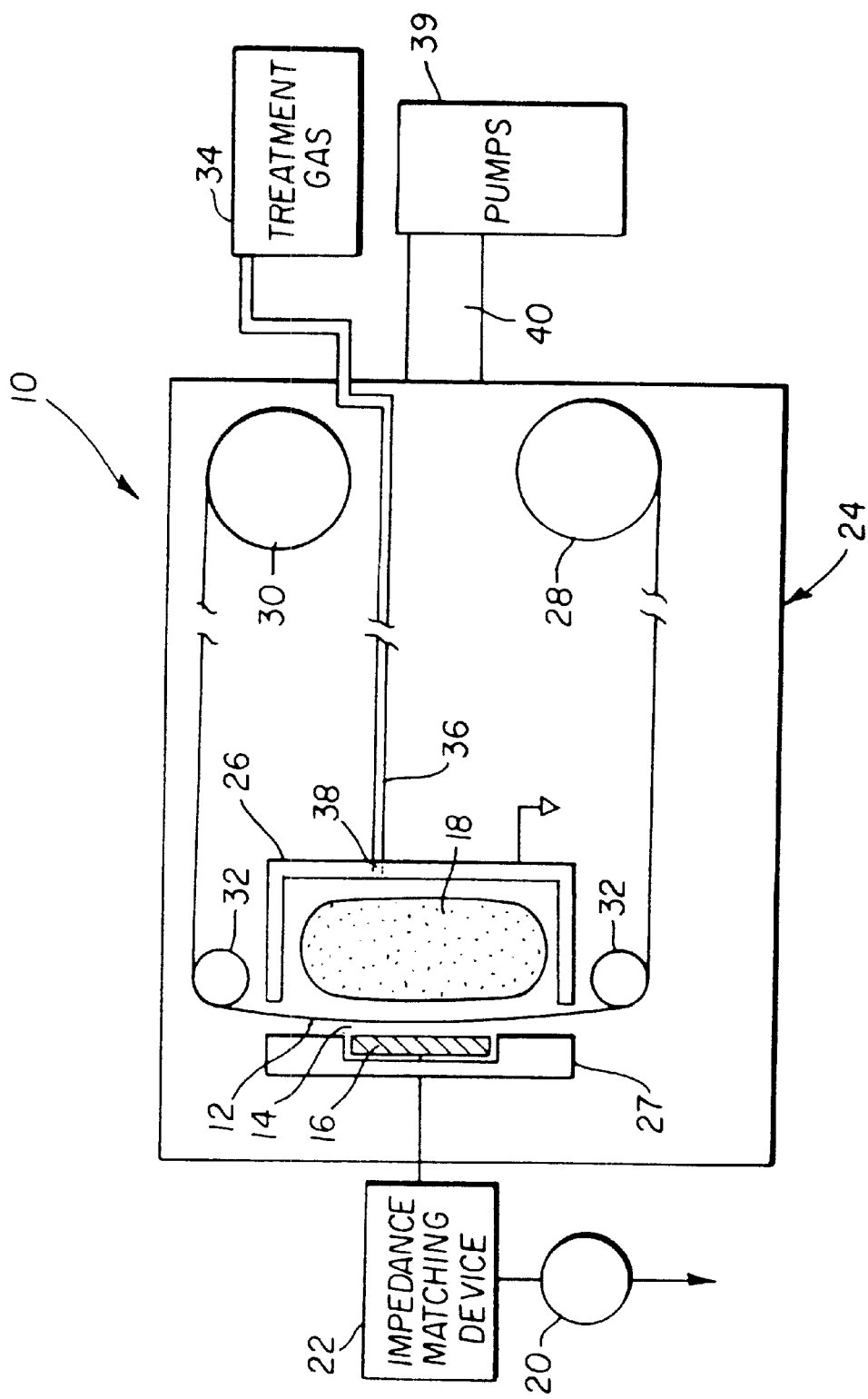
FIG. 1 is a schematic depicting a first embodiment of the treatment apparatus of the present invention.

Turning first to FIG. 1, there is schematically depicted a treatment apparatus 10 wherein the paper web 12 does not touch an electrode, but in contrast to the floating web configuration, the space 14 between the paper web 12 and the driven (smaller) treatment electrode 16 is a "dark space" (see B. Chapman, *Glow Discharge Processes: Sputtering and Plasma Etching*, John Wiley & Sons, New York, 1980). The term "dark space" as used herein is defined as a region wherein the breakdown voltage is locally higher than in other regions of a plasma-containing volume; it can also be a volume wherein proximity of surfaces and their associated losses prevents bulk ionization and thus prevents screening of electric fields. A dark space can be created by positioning of grounded surfaces near electrodes, or it can occur naturally by generation of a plasma sheath region near an electrode. Dark spaces are characterized by low luminosity, low ion density, and the lack of ability to screen out considerable electric fields. The dark space 14 supports the strong electric field that results from applying a high voltage to the treatment electrode 16, and the surface of the paper web 12 essentially serves as the electrode in contact with the plasma 18. Alternating high-voltage is applied by use of a power supply 20 and an appropriate impedance matching device 22. The extent of the dark space 14 is determined by the working gas and pressure thereof, the applied voltage and power, the driving frequency, and geometrical factors such as the distance between the paper web 12 and other surfaces in the chamber 24, including that of a second or counter electrode 26. The plasma zone is defined by an enclosure. The enclosure preferably comprises second electrode 26 and shield 27 for the treatment electrode 16. Alternatively, the enclosure for the plasma zone can be the vacuum chamber 24 itself. The treatment zone is in the dark space 14 between the treatment electrode 16 and the plasma 18. Although not shown, those skilled in the art will recognize that the treatment electrode 16 and second electrode 26 should be cooled as appropriate for heat load taking into account the material from which the treatment electrode 16 and second electrode 26 are made.

The path of paper web 12 is defined by a web drive/conveyance system which includes take-up roller 28, unwind roller 30, and idler rollers 32 as well as any other devices required to convey the paper web 12 from the unwind roller 30 through the treatment zone, and to the take-up roller 28. Treatment gas 34 is provided to the treatment zone by a suitable gas delivery line 36 and inlet 38, which can be a showerhead or some other arrangement of suitable openings into the treatment zone. For operation with treatment gases other than air, the region outside the treatment zone is pumped to below the treatment pressure using appropriate pumps 39 and plumbing 40. For operation in air, the treatment zone may be pumped, and the external chamber 24 may provide the flow of treatment gas.

Figure 2:
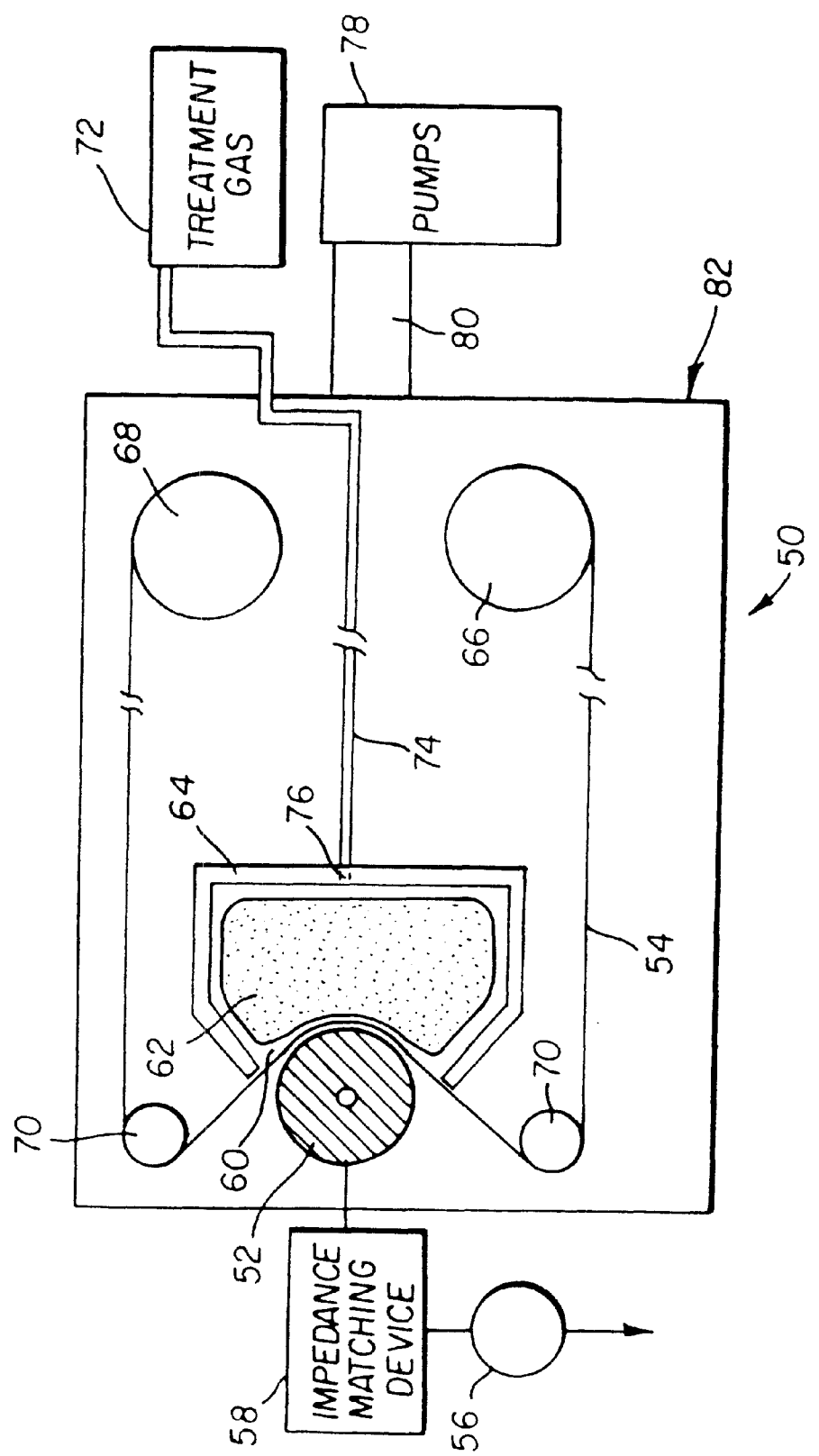
FIG. 2 is a schematic depicting an alternative embodiment of the treatment apparatus depicted in FIG. 1.

Looking next at FIG. 2, there is schematically illustrated an apparatus 50 that is an alternative embodiment of the apparatus 10 depicted in FIG. 1. Apparatus 50 has a configuration in which an electrically isolated roller 52 is used as a treatment electrode (driven and smaller electrode). The paper web 54 is placed against the roller 52, and alternating high voltage is applied to the roller 52 by use of a power supply 56 and an impedance matching device 58. As in FIG. 1, there is a dark space 60, a plasma 62, and a second or counter electrode 64. The second electrode 64 may be used to define the discharge volume.

The path of paper web 54 is defined by a web drive/conveyance system which includes take-up roller 66, unwind roller 68, and idler rollers 70 as well as any other devices required to convey the paper web 54 from the unwind roller 68 through the treatment zone, and to the take-up roller 66. Treatment gas 72 is provided to the treatment zone by a suitable gas delivery line 74 and inlet 76, which can be a showerhead or some other arrangement of suitable openings into the treatment zone. For operation with treatment gases other than air, the region outside the treatment zone is pumped to below the treatment pressure using appropriate pumps 78 and plumbing 80. For operation in air, the treatment zone may be pumped, and the external chamber 82 may provide the flow of treatment gas.

Figure 3:
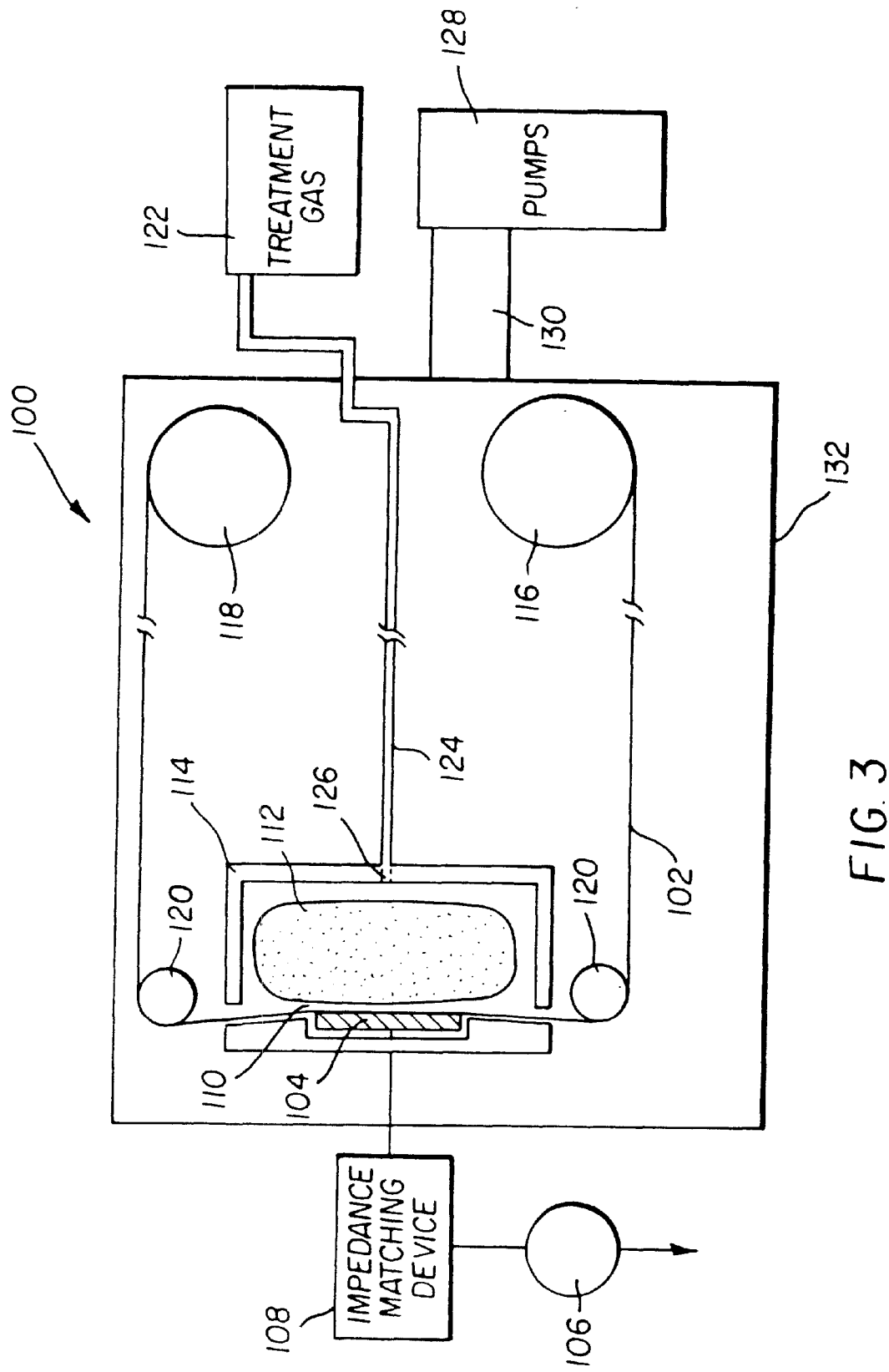
FIG. 3 is a schematic depicting another alternative embodiment of the treatment apparatus depicted in FIGS. 1 and 2.

FIG. 3 schematically illustrates an apparatus 100 which is yet another alternative embodiment of the apparatus 10 and the apparatus 50 depicted in FIGS. 1 and 2, respectively. Apparatus 100 has a treatment configuration in which the rear surface of the paper web 102 is in contact with a stationary, electrically driven (smaller) electrode 104. Alternating high voltage is applied to the electrode 104 by use of a power supply 106 and appropriate impedance matching device 108. As in FIG. 1, there a dark space 110, a plasma 112, and a second or counter electrode 114. As shown, the second electrode 114 may be used to define the discharge volume. The path of paper web 102 is defined by a web drive/conveyance system which includes take-up roller 116, unwind roller 118, and idler rollers 120, as well as any other devices required to convey the paper web 102 from the unwind roller 118 through the treatment zone, and to the take-up roller 116. Treatment gas 122 is provided to the treatment zone by a suitable gas delivery line 124 and inlet 126, which can be a showerhead or some other arrangement of suitable openings into the treatment zone. For operation with treatment gases other than air, the region outside the treatment zone is pumped to below the treatment pressure using appropriate pumps 128 and plumbing 130. For operation in air, the treatment zone may be pumped, and the external chamber 132 may provide the flow of treatment gas.

The exact configuration of web drive/conveyance system, chambers, enclosures and pumps is dictated by the required treatment pressure, the required treatment gas purity, and the quality of any seals made between higher and lower pressures by baffling, nip rollers, or the like in the web path. While the web drive/conveyance system is indicated to be within the vacuum chamber 24, 50, 132, the treatment geometries depicted in FIGS. 1–3 may readily be incorporated into an "air-to-air" device, wherein the wind and unwind rollers are placed outside the vacuum chamber 24, 50, 132, and the paper web 12, 54, 102 passes through differentially pumped regions and appropriate pressure seals (i.e., constricted openings and baffles or nip regions) placed before and after the treatment zone.

In the practice of the present invention, a paper web 12, 54, 102 is conveyed through a plasma zone such that the surface to be treated lies in the sheath region (dark space 14, 60, 110) of a driven electrode 16, 52, 104. Furthermore, the area of the driven electrode 16, 52, 104 is significantly smaller than the area of the counter electrode 26, 64, 114 or grounded surface area, such that the peak voltage drop across the driven electrode sheath is comparable to twice the amplitude of the driving voltage. The driving frequency is lower than 13.56 MHz, is chosen (as described above) based on the charging time of the web surface, and is preferably 450 kHz or lower.

The treatment gas 34, 72, 122 may contain nitrogen or oxygen, mixtures of nitrogen- or oxygen-containing gases with inert gases (such as argon or helium), mixtures of nitrogen with hydrogen-containing gases (such as hydrogen, water, or ammonia), mixtures of oxygen with oxygen containing gases (such as carbon dioxide or water), or mixtures of nitrogen and oxygen (such as air). The treatment gas 34, 72, 122 may also contain water vapor or mixtures of water vapor with inert or reactive gases. For reasons of safety and cost, the treatment gas 34, 72, 122 is preferably nitrogen, oxygen or mixtures thereof and is chosen depending on the desired surface chemistry on the paper support 12, 54, 102 to be treated. Alternatively, the moisture contained in the paper stock itself (adsorbed to paper fibers or otherwise carried into the treatment zone along with the paper) may be used to establish a plasma treatment environment. Treatment pressures and gas flows must also be adjusted for the desired surface chemical effects and can be optimized by those skilled in the art, whether using external supplies of gas or using the species that are liberated from the paper web as it is conveyed into the treatment zone. The maximum possible operating pressure at which a glow-discharge plasma exists in the treatment zone is determined by the gas, the geometry of the treatment zone, and the mode of establishing and sustaining the discharge.

The paper web 12, 54, 102 may contain additional additives such as polymers, aliphatic hydrocarbons, aromatic hydrocarbons, ester groups, or combinations thereof, the exact composition being dictated by the usage and functioning of the article to be coated.

The coatings (such as, for example, gelatin-containing layers, polymer films, priming layers or subbing layers) applied to the treated paper supports 12, 54, 102 are those which are capable of interaction with the functional groups formed by the method of the present invention. The coating may be gelatin-containing layers or any required coating where the adhesion thereof to webs is promoted by the presence of or is known to be reactive with amines or imines, as produced by nitrogen plasma treatment. The coatings may also be any required coatings where the adhesion thereof to webs is promoted by the presence of or is known to be reactive with hydroperoxy, ether, hydroxyl, epoxy, carbonyl and carboxyl groups as produced by oxygen or water plasma treatment. For example, the coatings can be reactive with amines and imines (in the case of nitrogen treatments) or hydroperoxy, ether, epoxy, hydroxyl, carbonyl, or carboxyl groups (in the case of oxygen plasma, water plasma, and related plasma treatments). Furthermore polymer coatings applied to paper supports are also those which are capable of bonding by weak interactions, once a weakly bound layer of low molecular weight species has been removed from the paper surface. Ideally, the combination of removal of a weak layer and the incorporation of reactive chemical groups provides the best resultant adhesion. The coatings may include: hydrophilic colloid layers, such as gelatin, and blends thereof with hydrophilic nonphotosensitive polymers; amine reactive hardening compounds, such as bisvinylsulfonylmethane, or blends thereof with gelatin or hydrophilic nonphotosensitive polymers; or polymeric hardeners containing amine-reactive side groups. The coatings may also include ink receiving layers. They may also include polyolefin films. Alternatively, hydrophyllic colloid layers such as photographic emulsions can be applied to the treated paper supports 12, 54, 102.

For applications involving treated paper stock and other porous, textured, or fibrous polymer surfaces and webs, the invention may be used to prepare the treated paper stock for contact with extruded resins. A further contemplated application of this invention is the preparation of raw paper stock surfaces to receive an extruded resin tie layer in combination with an additional polymer layer or multiple layer structure such as taught in U.S. Pat. Nos. 5,853,965 to Haydock et al., U.S. Pat. Nos. 5,866,282 and 5,874,205 to Bourdelais et al., and U.S. Pat. No. 5,888,643 to Aylward et al. A further contemplated application is direct contact bonding between the treated paper surface and a polymer web material. The polymer resins applied to the treated paper surface are preferably polyolefins such as polyethylene or polypropylene, and said materials with additives to give desired physical properties. Common additives are colorants, pigments, optical brighteners, whiteners, antioxidants, inorganic and organic fillers, additives to induce adhesion, and plasticizers. Furthermore, the resins applied to the treated paper surface may be porous or non-porous or may contain voids.

Looking next at FIG. 4, there is shown a cross-sectional schematic of a test apparatus 140 used to construct the examples described below. This apparatus is based on the treatment geometry shown in FIG. 2. The test apparatus included a stainless steel rotating electrode 145 which was mounted in an aluminum enclosure 146, which was mounted inside the chamber 144 of a vacuum web coating machine. A grounded water-cooled aluminum counter electrode 147 was positioned opposite the rotating electrode 145 as shown. A power supply 150 was connected to a transformer 151, which was connected to a rotating electrical contact to apply power to the electrode 145. A dark space shield 148 was placed behind the rotating electrode 145 to prevent dissipation of power over the unused portion thereof. The rotating electrode 145 has an outer diameter of 12.7 cm and a length of 33 cm. The counter electrode 47 was machined to have a radius of curvature of 8.9 cm, with the curved surface placed a distance of 2.54 cm from the circumference of the rotating (treatment) electrode 145, resulting in a gap of 2.54 cm (between the rotating electrode 145 and the counter electrode 147) in which a plasma is ignited. A gas inlet 142 and cooling lines 143 were attached to appropriate channels incorporated into the counter electrode assembly. Treatment gas entered the plasma treatment gap through two rows of holes located on the counter electrode surface near the center of the treatment device. Mechanical pumps (not shown) and diffusion pumps (not shown) were used to achieve rough vacuum and high vacuum, respectively, via pumping ports 141. The web 153 was conveyed from an unwind roller 155 over idler rollers 157 through the treatment device and to a take up roller 159. The web enters and exits the treatment device via slits 149.

The specifics of the invention relate to plasma treatment of paper stock for the aforementioned purposes. Nonetheless, it should be apparent to those skilled in the art that the same concepts (i.e. appropriate placement of the article to be treated, combined with appropriate choice of driving frequency as described herein) may prove fruitful for boosting the efficiency of plasma treatments of other polymer supports for other purposes. For example, the high-efficiency approach described herein can be applied in general to polyesters, such as for example poly(ethylene terephthalate) (PET), polycycloalkylene terephthalates (such as, poly(cyclohexylene dimethylene terephthalate)), and poly(ethylene napthalate) (PEN); blends of polyesters with other polyesters, such as poly(ethylene terephthalate) blended with poly(ethylene naphthalate), poly(ethylene terephthalate) blended with poly(cyclohexylene dimethylene terephthalate) (PCHDMT), poly(cyclohexylene dimethylene terephthalate) blended with poly(ethylene napthalate), poly(ethylene terephthalate) blended with polyarylates, poly (ethylene napthalate) blended with polyarylates, and poly (cyclohexylene dimethylene terephthalate) blended with polyarylates; polyesters blended with polycarbonates, such as PET, PEN, or PCHDMT with the polycarbonates of bisphenol-A, polycarbonates of 3,3,5-trimethylene-bisphenol, or copolycarbonates containing both bisphenols; polyesters blended with polyetherimide (PEI), such as PEN blended with PEI, PET blended with PEI, and PCHDMT blended with PEI; polyolefins, such as for example polyethylene and polypropylene; polystyrenes, such as for example polystyrene (tactic, atactic, or syndiotactic) and poly-α-methyl styrene; acrylesters such as, for example, polymethylmethacrylate; polycarbonates; and cellulose derivatives such as, for example, cellulose triacetate, cellulose acetate butyrate and the like, and paper products from vegetable, synthetic, or mineral fibers as described above. It may also be applied to polysulfones and polyetherimides. It may also be applied to laminates comprising materials such as mentioned above and other kinds of supports, such as paper or metallic webs. (In the case of metallic webs, additional effort would be required in the design of the treatment zone housing such that a high-voltage sheath is present above the metallic web surface).

Other possible applications include the treatment of supports that will be coated or laminated with ink-receiving layers useful for inkjet printing. Such supports include paper stock, plain paper, paper that has been laminated with polyolefin resins or inorganic oxide filled polyolefin resins, non-transparent polymeric supports and synthetic papers, and transparent polymeric supports. Examples of these include cellulose derivatives such as a cellulose ester, cellulose triacetate, cellulose diacetate, cellulose acetate propionate, cellulose acetate butyrate, polyesters, such as polyethylene terephthalate or polyethylene naphthalate, poly-1,4-cyclohexanedimethylene terephthalate, polybutylene terephthalate, and copolymers thereof, polyimides, polyamides, polycarbonates, polystyrene, polyolefins, such as polyethylene, polypropylene, polysulfones, polyarylates, polyether imides and blends of these. The ink receiving layer useful for inkjet printing can be either porous or non-porous, and can be comprised of water swellable or water non-swellable polymers and mixtures thereof. Water swellable polymers include, for example, gelatin, acetylated gelatin, phthalated gelatin, oxidized gelatin, chitosan, poly(alkylene oxide), poly(ethyleneoxide), poly(vinyl alcohol), modified poly(vinyl alcohol), sulfonated polyester, partially hydrolyzed poly(vinylacetate/ vinyl alcohol), poly(acrylic acid), poly(sodium styrene sulfonate), poly(2-acrylamido-2-methane sulfonic acid), poly(vinylpyrrolidone) and vinylpyrrolidone-containing copolymers, poly(ethyl oxazoline) and oxazoline-containing copolymers, polyacrylamides and acrylamide-containing copolymers, poly(vinyl methyl ether), poly(vinyl ethyl ether), hydroxyethylcellulose, hydroxpropylcellulose, hydroxy propyl methylcellulose, methylcellulose, and mixtures thereof. Water non-swellable polymers include, for example, cellulose esters such as cellulose diacetates and triacetates, cellulose acetate propionate, cellulose acetate butyrate, cellulose nitrate, polyacrylates such as polymethyl methacrylate, polyphenylmethacrylate and copolymers with acrylic or methacrylic acid, or sulfonates, polyesters, polyurethanes, polysulfones, urea resins, melamine resins, urea-formaldehyde resins, polyacetals, polybutyrals, epoxies and epoxy acrylates, phenoxy resins, polycarbonates, vinyl acetate polymers and copolymers, vinyl chloride-vinyl acetate copolymers, vinyl chloride-vinyl acetate-vinyl-alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-styrene copolymers, butadiene-acrylonitrile copolymers, acrylonitrile-butadiene-acrylic or methacrylic acid copolymers, styrene-butadiene, and mixtures thereof. Mixtures of water swellable and water non-swellable polymers can also be used. The ink receiving layer useful for inkjet printing can also contain organic plastic pigments, polymeric latex particles, or inorganic particles such as, for example, silicon oxide, fumed silica, silicon oxide dispersions such as those available from Nissan Chemical Industries and DuPont Nemours, aluminum oxide, alumina, alumina hydrate, boehmite, amorphous alumina, calcium carbonate, barium sulfate, barium sulfate mixtures with zinc sulfide, nonmagnetic inorganic powders such as δ-aluminum oxide, chromium oxide, iron oxide, tin oxide, doped tin oxide, silicon dioxide, alumino-silicate, titanium dioxide, silicon carbide, titanium carbide, and diamond in fine powder, and mixtures thereof. The ink receiving layer useful for inkjet printing can also contain polymers that include moieties that serve as mordant sites to improve the fixability of an inkjet image, thereby improving waterfastness and smear. Examples of effective mordants include imidazole-containing polymers and copolymers, vinylpyridine-containing polymers and copolymers, chitosan and chitosan derivatives, and polymers containing quaternary ammonium groups. Examples of quaternary ammonium units include trimethylvinylbenzylammonium chloride, benzyldimethylvinylbenzylammonium chloride, dimethyloctadecylvinylbenzyl ammonium chloride and the like. Counterions other than chloride can also be used. U.S. Pat. Nos. 5,223,338, 5,354,813, and 5,403,955, and references cited, discuss additional polymers that would be suitable for use as mordant polymers. Combinations of these can also be used. Other examples of effective mordants include sulfonates and carboxylates of styrene polymers, acrylate polymers, and polyesters.

A photographic paper support was produced by refining a pulp furnish of 100% bleached hardwood Kraft through a double disk refiner, then a Jordan conical refiner. To the resulting pulp furnish was added (on a dry weight basis) 0.877% sodium stearate, 0.527% aluminum chloride, 0.15% stilbene triazine FWA, 0.243% polyamide-epichlorohydrin, 0.682% anionic polyacrylamide, and 0.6% $TiO_2$. Approximate dry basis weight of 14.3 kg per 93 $m^2$ paper was made on a Fourdrinier paper machine, wet pressed to 42% solids, and dried to a 1% moisture and apparent density of 0.70 g/cc using steam-heated dryers. The paper base was then surface sized using a horizontal size press with a hydroxyethylated cornstarch solution to achieve a loading of 3.6-wt. % starch. In addition to the starch, a sodium bicarbonate and sodium chloride solution are added at the size press with the starch solution to achieve a neutral paper extractable pH and a salt coverage of approximately 1.2 (gsm) grams per square meter. The surface sized support was dried to moisture of 8.8% using steam-heated dryers and calendered to an apparent density of 1.08 g/cc.

Figure 4:
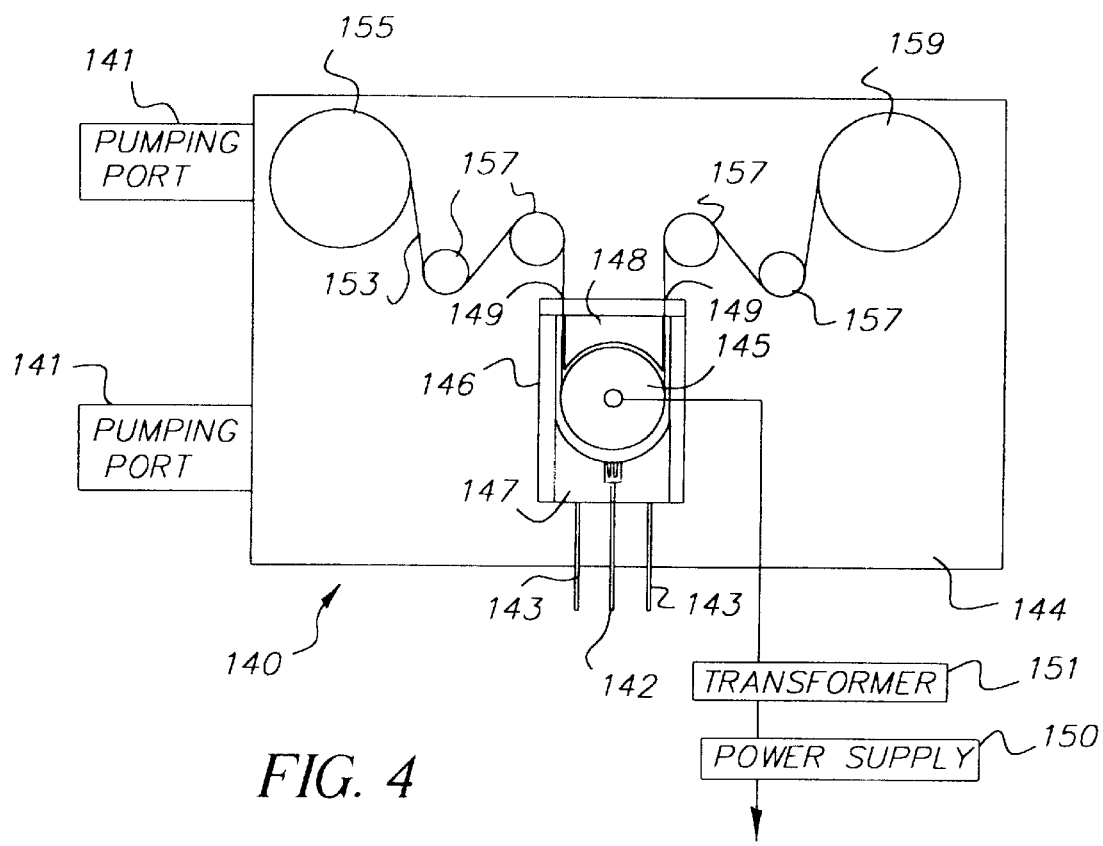
FIG. 4 is a cross-sectional schematic of a test apparatus used to conduct 40 kHz treatment exemplary tests in accordance with the method of the present invention.

Rolls of 150μ thick paper prepared as described above were loaded into the vacuum coating apparatus (140 of FIG. 4 and placed on the unwind roller (155. In addition to the paper described above (heretofore referred to as Kodak raw paper stock), 150μ thick Georgia Pacific [Nekoosa Solutions Smooth (Georgia Pacific), Grade 5128 (Carrara White, Color 9220), Basis Weight 45.5 kg/307 $m^2$] was also treated using the apparatus (140) schematically depicted in FIG. 4. The chamber 144 was pumped to a base pressure below $1 \times 10^{-4}$ Torr. Oxygen gas was admitted to the treatment gap between rotating electrode 145 and counter electrode 147 at a flow between 10 and 250 SCCM. After purging the enclosure 146 at steady state for 3 minutes, power was applied to the electrode 145 at a specified level for a specified treatment time, dictated by the speed of the moving web and the dimensions of the active surface of the rotating electrode. A 40 kHz power supply 150 with a matching transformer 151 was used to apply a high-voltage waveform to the rotating electrode 145 (see FIG. 4). Initial runs were carried out at low web speeds and low powers. Scalability of the process was verified by making a treatment at higher power (345 W) and higher speed (152 m/min). Depending on the time that the roll of paper spent in the vacuum chamber 144 under high vacuum prior to treatment, the observed degassing (i.e., desorption of water vapor from the web) varied. By adjusting the impedance of the treatment enclosure 146 (via entrance and exit slits 149) the partial pressure of water vapor in the treatment zone 160 could be varied as well. Treatments were made with predominantly oxygen (with an oxygen flow of roughly 200 SCCM) and with a substantial partial pressure of water vapor from the web (with oxygen flows from 100 SCCM down to 10 SCCM and less). The surface treatments appeared functionally equivalent. Treatments were also made with nitrogen flowing to the treatment zone.

For comparative purposes, samples were treated by dielectric barrier discharge (CDT) in air. The paper width was 34.3 cm. The paper web was treated using an apparatus consisting of a web transport system and a treater station. The roller of the CDT unit, (American Roller, 17.5 cm outer diameter, 43 cm face length, Arcotron CL-500 ceramic dielectric with 0.165 cm wall thickness), was equipped with a ceramic dielectric coating and was electrically grounded. The electrode assembly of the CDT unit consisted of eight (8) titanium bars, 19 cm in length, equally spaced around approximately one-quarter (¼) of the perimeter of the roller. The spacing between the roller and the electrode was adjustable for each electrode and was set at a constant 0.762 mm for each electrode in the treater assembly. Exhaust air flow to the CDT cabinet was held constant at nominally 236 l/s during all runs. The corona discharge treater power supply and accompanying transformer was manufactured by Pillar Corporation, (model P1025). This 2.5 kW power supply operates at a nominal frequency of 10 kHz.

The electrical characteristics of the corona discharge process were monitored using digital oscilloscope methods as described by L. A. Rosenthal and D. A. Davis in *IEEE Transactions on Industry Applications*, Vol 1A–11, No.3, May/June (1975) pp. 328–335. A current probe (Pearson precision current transformer model 110) and a high voltage probe (Tektronix 1000×High Voltage Probe model P6015A) were installed near the treater on the secondary side of the transformer. The signals from these probes were fed to a digital oscilloscope and the waveforms were analyzed to provide a measure of the secondary power of the process. The conditions used to generate comparative CDT examples are given in Table 1. Similar treatments were carried out on a pilot-scale corona treatment unit on 12.7 cm wide polyethylene-coated paper stock at doses between roughly 0.02 and 0.10 $J/cm^2$. Additional examples of CDT treatments of polyolefin surfaces, in particular CDT treated polypropylene, were found in the prior art literature (see Strobel et. al).

Surface chemical changes in the paper stock samples were assessed by use of X-ray photoelectron spectroscopy (XPS). The XPS spectra were acquired on a Physical Electronics 5601 photoelectron spectrometer with monochromatic Al KαX-rays (1486.6 eV). The X-ray source was operated with a 7-mm filament at 300 W. Charge neutralization was accomplished by flooding the sample surface with low energy electrons $\leq 25$ mA emission current, $\leq 0.5$ eV bias voltage) from an electron gun mounted nearly perpendicular to the sample surface. The pressure in the spectrometer during analysis was typically $\leq 3 \times 10^{-9}$ Torr. For the high resolution spectra, the analyzer was operated at a pass energy of 11.75 eV. Under these conditions, the full width at half maximum (FWHM) for the individual components of the C 1s peak in an untreated paper surface varied from 0.9 to 1.0 eV. All spectra were referenced to the C 1s peak of the aliphatic carbon atoms, which was assigned a value of 284.6 eV. Line-shape analyses were done using a least squares curve-fitting routine employing line shapes with variable Gaussian-Lorentzian character. Spectra were taken at a 45° electron takeoff angle, which corresponds to an analysis depth of ~5 nm.

XPS metrics found to be helpful in assessing surface chemistry are oxygen content and peak fits of the carbon (C 1s) region. The peak fits provide information on the surface concentration of specific carbon functionalities. The carbon 1s peak was broken down into four separate components: aliphatic carbon, carbon associated with ether, epoxy, or hydroxyl groups (C—O), carbon associated with methylenedioxy (O—C—O) or carbonyl (C=O) groups, and carbon associated with carboxylic acid groups (O—C=O). The methodology involves determining the number of components, constraining the peak positions within ±0.1 eV for the pure component, constraining the linewidths to 1.1±0.1 eV for the untreated surface and 1.2±0.1 eV for the treated surfaces, and using lineshapes with between 90 to 100% Gaussian character and 0 to 10% Lorentzian character. The output is the integrated area under each peak.

The results for the corona discharge treatment (CDT) of paper stock are shown in Table 1. The results for the high-efficiency plasma treatments of paper stock are shown in Tables 2 and 3.

TABLE 1

Comparative examples: treatment conditions and treated paper surface chemistry results for CDT at various speeds, powers, and gap settings. The treatments are on Kodak raw paper stock.

| Power (kW) | Speed (m/min) | Dose (J/cm²) | Gap (mm) | % Oxygen | % Carbon | aliphatic | C—O | O—C—O, C=O | Acid (O—C=O) |
|---|---|---|---|---|---|---|---|---|---|
| 0 | N/A | 0.000 | N/A | 28.5 | 68.6 | 36.9 | 23.8 | 6.7 | 1.2 |
| 0.38 | 366 | 0.032 | 0.76 | 30.8 | 66.6 | 31.8 | 25.5 | 7.6 | 1.7 |
| 0.56 | 274 | 0.065 | 0.76 | 33.6 | 63.3 | 25.9 | 27.1 | 8.4 | 1.9 |
| 0.75 | 366 | 0.065 | 2.22 | 33.5 | 63.8 | 26.6 | 27.1 | 8.4 | 1.7 |
| 0.375 | 183 | 0.065 | 2.22 | 31.1 | 66.1 | 31.3 | 25.3 | 7.9 | 1.7 |
| 0.54 | 274 | 0.065 | 3.68 | 32.1 | 65.1 | 29.1 | 26.1 | 8.2 | 1.7 |
| 1.06 | 366 | 0.091 | 0.76 | 34.6 | 62.4 | 25.1 | 26.5 | 8.6 | 2.2 |
| 0.531 | 183 | 0.091 | 0.76 | 34.5 | 62.4 | 25.6 | 26.2 | 8.7 | 1.9 |
| 0.797 | 274 | 0.091 | 2.22 | 34.1 | 62.9 | 25.9 | 26.4 | 8.6 | 2.0 |
| 0.797 | 274 | 0.091 | 2.22 | 33.6 | 63.7 | 27.7 | 26.1 | 8.2 | 1.7 |
| 0.797 | 274 | 0.091 | 2.22 | 33.9 | 63.2 | 25.7 | 27.1 | 8.5 | 1.8 |
| 1.06 | 366 | 0.091 | 3.68 | 31.9 | 65.3 | 29.6 | 25.9 | 8.2 | 1.6 |
| 0.531 | 183 | 0.091 | 3.68 | 32.7 | 64.4 | 28.3 | 25.8 | 8.4 | 1.9 |
| 1.03 | 274 | 0.118 | 0.76 | 35.1 | 61.5 | 24.6 | 25.6 | 9.3 | 2.0 |
| 1.37 | 366 | 0.118 | 2.22 | 34.3 | 62.8 | 25.9 | 26.5 | 8.5 | 1.9 |
| 0.69 | 183 | 0.118 | 2.22 | 33.9 | 63.6 | 26.9 | 26.3 | 8.4 | 2.0 |
| 1.03 | 274 | 0.118 | 3.68 | 34.5 | 62.9 | 25.9 | 26.3 | 8.7 | 2.0 |
| 0.53 | 274* | 0.129 | 0.76 | 36.8 | 60.1 | 21.4 | 27.2 | 9.3 | 2.2 |
| 0.83 | 122 | 0.215 | 0.76 | 37.8 | 58.7 | 19.8 | 26.9 | 9.5 | 2.5 |
| 1 | 274* | 0.237 | 0.76 | 39.5 | 56.6 | 16.8 | 27.5 | 9.5 | 2.9 |
| 1.67 | 122 | 0.431 | 0.76 | 40.3 | 55.9 | 16.1 | 27.1 | 9.6 | 3.1 |
| 2.4 | 122 | 0.646 | 0.76 | 39.9 | 55.5 | 16.3 | 26.8 | 9.1 | 3.3 |

TABLE 2

Examples of the present invention: treatment conditions and treated paper surface chemistry results for high-efficiency plasma treatments in oxygen and nitrogen at various-speeds and powers. The treatment gas pressure was nominally 0.25 Torr. The treatments are on Kodak raw paper stock.

| Gas | Power (W) | Speed (m/min) | Dose (J/cm²) | % Nitrogen | % Oxygen | % Carbon | % aliphatic | C—O | O—C—O, C=O | Acid (O—C=O) |
|---|---|---|---|---|---|---|---|---|---|---|
| N/A | 0 | N/A | 0.000 | 1.3 | 27.7 | 69.6 | 37.8 | 23.8 | 6.7 | 1.3 |
| Oxygen | 20 | 15.2 | 0.024 | 1.1 | 35.8 | 60.9 | 25.3 | 23.9 | 8.8 | 2.9 |
| Oxygen | 345 | 152.4 | 0.041 | 1.3 | 37.9 | 58.8 | 20.1 | 26.4 | 9.4 | 2.9 |
| Oxygen | 20 | 5.2 | 0.070 | 1.2 | 37.9 | 57.4 | 21.5 | 23.7 | 7.8 | 4.4 |
| Oxygen | 20 | 3.0 | 0.119 | 1 | 38.1 | 57.4 | 21 | 23.9 | 7.9 | 4.6 |
| Nitrogen | 20 | 15.2 | 0.024 | 1.5 | 31.8 | 65.1 | 32.3 | — | — | — |
| Nitrogen | 20 | 5.2 | 0.070 | 2.1 | 33.9 | 60.8 | 27.5 | — | — | — |
| Nitrogen | 20 | 3.0 | 0.119 | 2.8 | 34 | 60.9 | 25.7 | — | — | — |

TABLE 3

Examples of the present invention: treatment conditions and treated paper surface chemistry results for high-efficiency plasma treatments in oxygen and nitrogen. The treatment gas pressure was nominally 0.25 Torr. The treatments are on Georgia Pacific Paper.

| Gas | Power (W) | Speed (m/min) | Dose (J/cm²) | % Nitrogen | % Oxygen | % Carbon | % aliphatic | C—O | O—C—O, C=O | Acid (O—C=O) |
|---|---|---|---|---|---|---|---|---|---|---|
| N/A | 0 | 0.0 | 0.000 | 0.2 | 33.5 | 64.8 | 27.9 | 27.9 | 5.6 | 3.4 |
| Oxygen | 20 | 15.2 | 0.024 | 0.4 | 38.5 | 59.1 | 20.2 | 26.1 | 8.9 | 3.9 |
| Oxygen | 20 | 3.0 | 0.119 | 0.3 | 42.3 | 55.3 | 14.2 | 26.8 | 9.8 | 4.5 |
| Nitrogen | 20 | 15.2 | 0.024 | 1.7 | 36.1 | 60.4 | 22.6 | — | — | — |
| Nitrogen | 20 | 3.0 | 0.119 | 3.8 | 34.2 | 60.7 | 23.2 | — | — | — |

As can be seen from Tables 1 and 2, both CDT and high-efficiency oxygen plasma treatment result in the removal of aliphatic carbon species, the addition of oxygen, and the formation of acid groups. The aliphatic carbon content drops from 37 atom % to near 20 atom %, while oxygen content increases from roughly 28 atom % to 40 atom %. Furthermore, the amount of carbon in the form of acid groups rises from 1 atom % to more than 3 atom %. These effects are also evident from the data shown in Table 3 for high-efficiency treatment of the Georgia Pacific paper. While these general trends are similar for CDT and high-efficiency plasma treatment, there are significant differences in the dependence of these trends on dose, as evidenced by plots of the data shown in FIGS. 5–7.

The data in Tables 2 and 3 also show that nitrogen plasma treatment removes surface aliphatic groups and results in some incorporation of nitrogen into the treated surface. One skilled in the art will recognize that gases other than nitrogen and oxygen, such as, for example, argon, should be capable of removal of surface aliphatic species in the practice of the method of the present invention.

Figure 5:
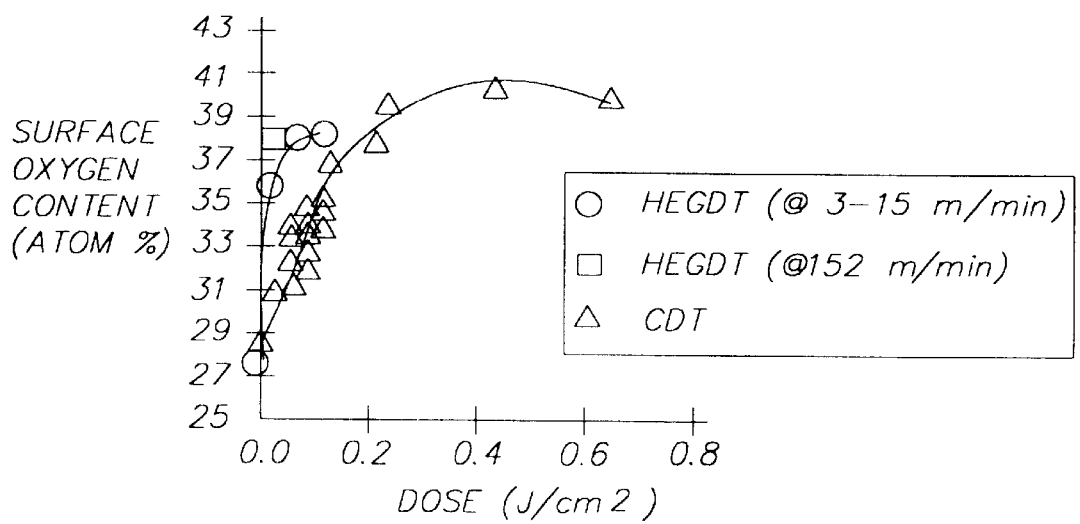
FIG. 5 is a graph plotting surface oxygen content as a function of high-efficiency treatment dose (HEGDT) using the configuration of FIG. 4 and, for comparison, using corona discharge treatment (CDT) on Kodak Edge™ paper stock.
Figure 6:
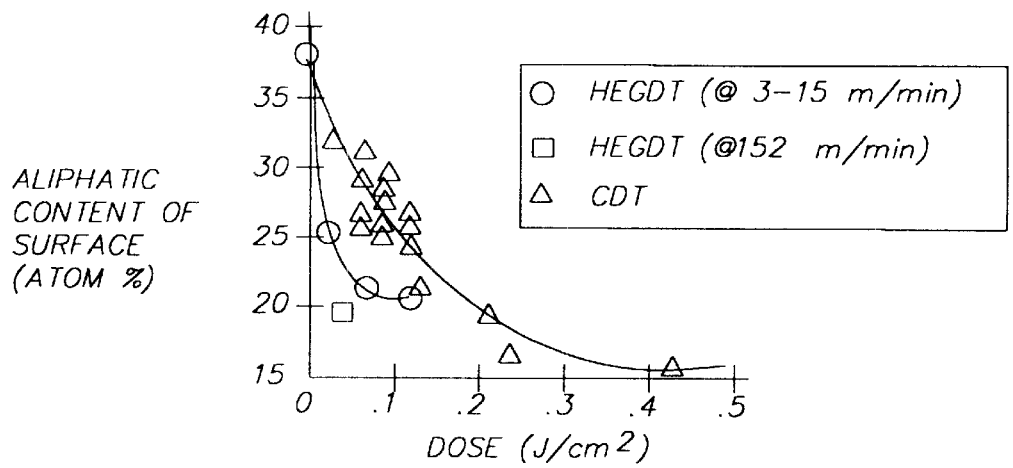
FIG. 6 is a graph plotting surface aliphatic content as a function of treatment dose for "high-efficiency" plasma treatment (HEGDT) using the configuration of FIG. 4 and, for comparison, using corona discharge treatment (CDT) on Kodak raw paper stock.
Figure 7:
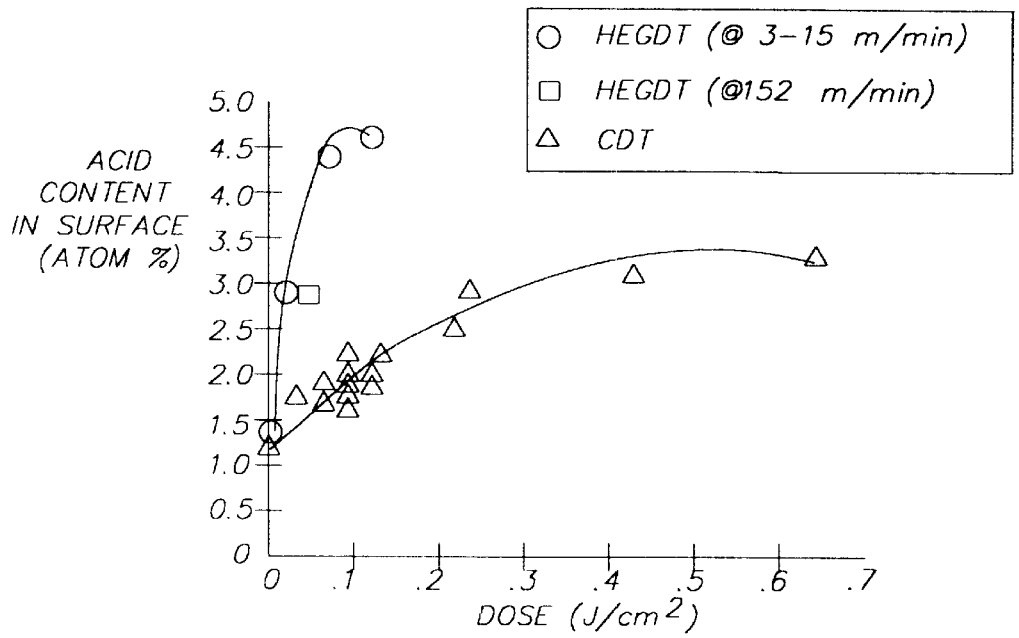
FIG. 7 is a graph plotting surface acid content as a function of treatment dose for "high-efficiency" plasma treatment (HEGDT) using the configuration of FIG. 4 and, for comparison, using corona discharge treatment (CDT) on Kodak raw paper stock.

FIGS. 5, 6 and 7, respectively, illustrate the dependence of oxygen incorporation, removal of aliphatic groups, and formation of acid groups on oxygen treatment dose for Kodak Edge™ paper stock. As can be seen from FIGS. 5 and 6, the saturation value of surface oxygen content and remnant aliphatic content from high-efficiency plasma treatment are achieved at roughly 0.1 J/cm². In contrast, the saturation of the surface chemistry occurs at roughly twice the dose (0.2 J/cm²) for CDT. More important, the surface acid content achieved at a dose of 0.1 J/cm² with high-efficiency plasma treatment (4.5%) is twice that obtained with similar doses by CDT (2.2%). Furthermore, the surface acid content resulting from high-efficiency plasma treatment at 0.1 J/cm² appears to exceed the maximum attainable surface acid content (roughly 3.3 atom %) from CDT at considerably higher doses (i.e., >0.4 J/cm²). If more than 3 atom % carbon associated with acid groups is required, then the high-efficiency plasma treatment affords an order of magnitude reduction in the required dose (i.e. from 0.5 J/cm² for CDT to 0.05 J/cm² for the present invention).

The examples presented in Tables 1 and 2 and FIGS. 5–7 thus establish that low-frequency treatments with the web on a driven electrode that is significantly smaller than its counter electrode can produce unexpectedly high efficiency of formation of acid groups than typical CDT treatments carried out at atmospheric pressure. To the extent that ion bombardment on the smaller electrode, or energetic secondary electrons emitted as a consequence are important in determining the resultant surface chemistry, there will be maximum frequency beyond which the surprising benefits of placing the sample on the driven smaller electrode are lost. This maximum frequency can be determined empirically by those skilled in the art. The complications associated with power delivery and impedance matching in the high-frequency range can occur above 2 MHz. Hence the useful range of this invention can be considered to be below 2 MHz.

The lowest frequency that this invention can likely be used is determined by the charging characteristics of the polymer surface in the presence of the plasma. If the support surface charges quickly compared to the period of the driving voltage, the plasma may acquire a pulsed character, as the support surface will rapidly acquire the floating potential, thereby reducing the electric field across the cathode sheath and limiting the useful portion of the discharge cycle. Chapman estimates the charging time (in seconds) as $t_c CV/j_i$, where C is the capacitance of the support/electrode combination, V is the applied voltage, and $j_i$ is the discharge current (see B. Chapman, p. 142). The discharge current depends on geometry and plasma conditions, but is typically of the order $10^{-3}$ A/cm². For typical polyesters, the dielectric constant is roughly 3, and the capacitance C is then given by $C=3.2\times10^{-13}/d$ (in units of F/cm²), where d is the thickness of the polymer web in cm. The discharge voltage, V, depends on the electrode geometry and the discharge gas, as governed by the Paschen relation. Typical values at low frequencies, however, are roughly 1000 V. Hence, the charging time $t_c$ is expected to be roughly $3.2\times10^{-7}/d$ seconds. Hence, for 100µ thick polyester base, the charging time is roughly 32 µs, corresponding to a lower operating frequency of roughly 30 kHz. In comparison, 10µ thick polyesters could be treated at frequencies as low as 3 kHz, and 1 mm thick polyesters would require driving frequencies above 300 kHz. As indicated above, however, the exact value of the minimum operating frequency depends on the dielectric constant of the polymer web, driving voltage, and discharge current, the latter two parameters in turn depending on geometry, gas in the discharge, and applied power. The general limitation is that the minimum driving frequency be comparable to $1/t_c$. Based on the $1/t_c$ criterion, one skilled in the art can determine a suitable lower bound of operating frequency for the polymer web and treatment apparatus used.

Although the treatment electrodes 16, 52, 104 have been described herein as being the driven electrodes, it should be understood that the method and apparatus of the present invention can also be practiced by driving the second electrodes 26, 64, 114 and grounding the treatment electrodes 16, 52, 104. The treatment electrodes 16, 52, 104 remain the treatment electrodes and have a surface area in the treatment zone which is not greater than the surface area of the counter electrode. Further, the treatment configurations as depicted in the FIGS. 1–3 remain the same with the exception that the second electrodes 26, 64, 114 become the driven electrodes.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for treating paper materials with a plasma comprising the steps of:
   (a) supplying a treatment gas to a plasma zone in an enclosure;
   (b) driving a treatment electrode or a counter electrode with an oscillating high voltage at a frequency less than about 2 MHz and greater than $1/t_c$ where $t_c$ is the charging time of a web surface exposed to a rms ion current in the plasma generated in the enclosure with the treatment electrode and the counter electrode, the treatment electrode having a surface area in a treatment zone which is not greater than a surface area of the counter electrode, the treatment zone residing between the plasma and the treatment electrode;
   (c) conveying a paper web through the treatment zone in the enclosure; and
   (d) generating in the treatment zone with the plasma a surface on the paper web having the treatment gas incorporated therein in the form of reactive surface groups.

2. A method as recited in claim 1 further comprising the step of:
   removing or cross-linking aliphatic material from the surface of the paper web.

3. A method as recited in claim 1 wherein:
   the paper web receives a treatment dose of less than 0.5 J/cm².

4. A method as recited in claim 1 further comprising the step of:
   subsequently coating the paper web with a non-photosensitive layer.

5. A method as recited in claim 4 wherein:
   adhesion of the non-photosensitive layer is promoted by the presence of one or more of the following reactive surface groups: hydroperoxy, ether, epoxy, hydroxyl, carbonyl, or carboxyl groups formed on the surface of the web.

6. A method as recited in claim 4 wherein:
   adhesion of the non-photosensitive layer is promoted by the presence of the reactive surface groups, the reactive surface groups being nitrogen containing groups formed on the surface of the web.

7. A method as recited in claim 4 wherein:
   the treatment gas contains oxygen or water and the non-photosensitive layer is reactive with at least one of the active surface groups: hydroperoxy, ether, epoxy, hydroxyl, carbonyl, or carboxyl groups formed on the surface of the web.

8. A method as recited in claim 1 further comprising the step of:
   subsequently coating the paper web with an imaging layer.

9. A method for treating paper web materials as recited in claim 1 further comprising the step of:
   subsequently coating the paper web material with a photosensitive layer.

10. A method as recited in claim 2 wherein:
    the treatment gas contains water vapor.

11. A method for treating paper material with a plasma comprising the steps of:
    (a) supplying a treatment gas to an enclosure;
    (b) driving a treatment electrode or a counter electrode with an oscillating high voltage at a frequency less than about 2 MHz and greater than $1/t_c$ where $t_c$ is the charging time of a web surface exposed to a rms ion current in the plasma generated in the enclosure with the treatment electrode and the counter electrode, the treatment electrode having a surface area in a treatment zone which is not greater than a surface area of the counter electrode;
    (c) conveying a paper web through the treatment zone between the plasma and the treatment electrode; and
    (d) incorporating the treatment gas in the treatment zone into a surface of the paper web in the form of oxygen containing reactive surface groups or nitrogen containing reactive surface groups.

12. A method as recited in claim 11 further comprising the step of:
    removing or cross-linking aliphatic carbon species from the surface of the paper web.

13. A method as recited in claim 12 wherein:
    the treatment gas contains water vapor.

14. A method as recited in claim 11 wherein:
    the paper web receives a treatment dose of less than 0.5 J/cm$^2$.

15. A method as recited in claim 11 further comprising the step of:
    subsequently coating the paper web with a non-photosensitive layer.

16. A method as recited in claim 15 wherein:
    adhesion of the non-photosensitive layer is promoted by the presence of at least one of the following reactive surface groups: hydroperoxy, ether, epoxy, hydroxyl, carbonyl, or carboxyl groups formed on the surface of the web.

17. A method as recited in claim 15 wherein:
    adhesion of the non-photosensitive layer is promoted by the presence of the reactive surface groups, the reactive surface groups being nitrogen containing groups formed on the surface of the web.

18. A method as recited in claim 15 wherein:
    the treatment gas contains oxygen or water and the non-photosensitive layer is reactive with at least one of the active surface groups: hydroperoxy, ether, epoxy, hydroxyl, carbonyl, or carboxyl groups formed on the surface of the web.

19. A method as recited in claim 11 further comprising the step of:
    subsequently coating the paper web with an imaging layer.

20. A method for treating paper web materials as recited in claim 11 further comprising the step of:
    subsequently coating the paper web material with a photosensitive layer.

21. A method for treating paper web materials as recited in claim 12 further comprising the step of:
    subsequently coating the paper web material with an ink receiving layer.

22. A method for treating paper materials with a plasma comprising the steps of:
    (a) supplying a treatment gas to a plasma zone;
    (b) driving a treatment electrode or a counter electrode with an oscillating high voltage at a frequency less than about 2 MHz and greater than $1/t_c$ where $t_c$ is the charging time of a web surface exposed to a rms ion current in the plasma generated in the plasma zone with the treatment electrode and the counter electrode, the treatment electrode having a surface area in a treatment zone which is not greater than a surface area of the counter electrode;
    (c) generating the plasma in the plasma zone with the treatment electrode and the counter electrode; and
    (d) conveying a paper web through the treatment zone between the plasma and the treatment electrode thereby removing or cross-linking aliphatic carbon species from the surface of the paper web and forming reactive surface groups on the surface of the paper web.

23. A method as recited in claim 22 further comprising the step of:
    incorporating the treatment gas into the surface of the paper web to form the reactive surface groups in the form of oxygen containing groups or nitrogen containing groups.

24. A method for treating paper web materials as recited in claim 22 further comprising the step of:
    subsequently coating the paper web material with a photosensitive layer.

25. A method for treating paper web materials as recited in claim 23 further comprising the step of:
    subsequently coating the paper web material with an ink receiving layer.

26. A method as recited in claim 22 wherein:
    the paper web receives a treatment dose of less than 0.5 J/cm$^2$.

27. A method as recited in claim 22 further comprising the step of:

subsequently coating the paper web with a non-photosensitive layer.

28. A method as recited in claim 27 wherein:

adhesion of the non-photosensitive layer is promoted by the presence of at least one of the following reactive surface groups: hydroperoxy, ether, epoxy, hydroxyl, carbonyl, or carboxyl groups formed on the surface of the web.

29. A method as recited in claim 27 wherein:

adhesion of the non-photosensitive layer is promoted by the presence of the reactive surface groups, the reactive surface groups being nitrogen containing groups formed on the surface of the web.

30. A method as recited in claim 22 further comprising the step of:

subsequently coating the paper web with an imaging layer.

* * * * *